Sept. 12, 1972  I. N. SMITH ET AL  3,690,852
METHOD OF PRODUCING GRADED FIBROUS FILTER MEDIA
Filed Dec. 29, 1969  2 Sheets-Sheet 2

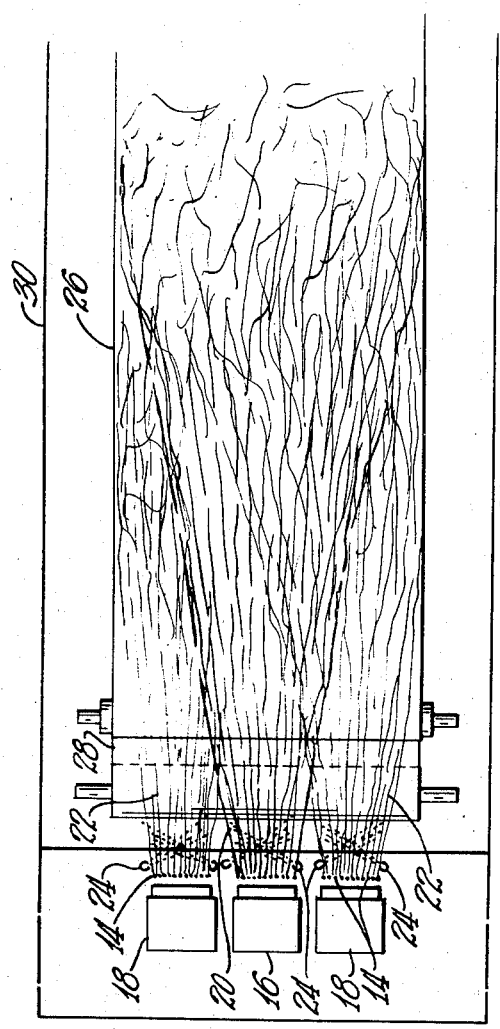
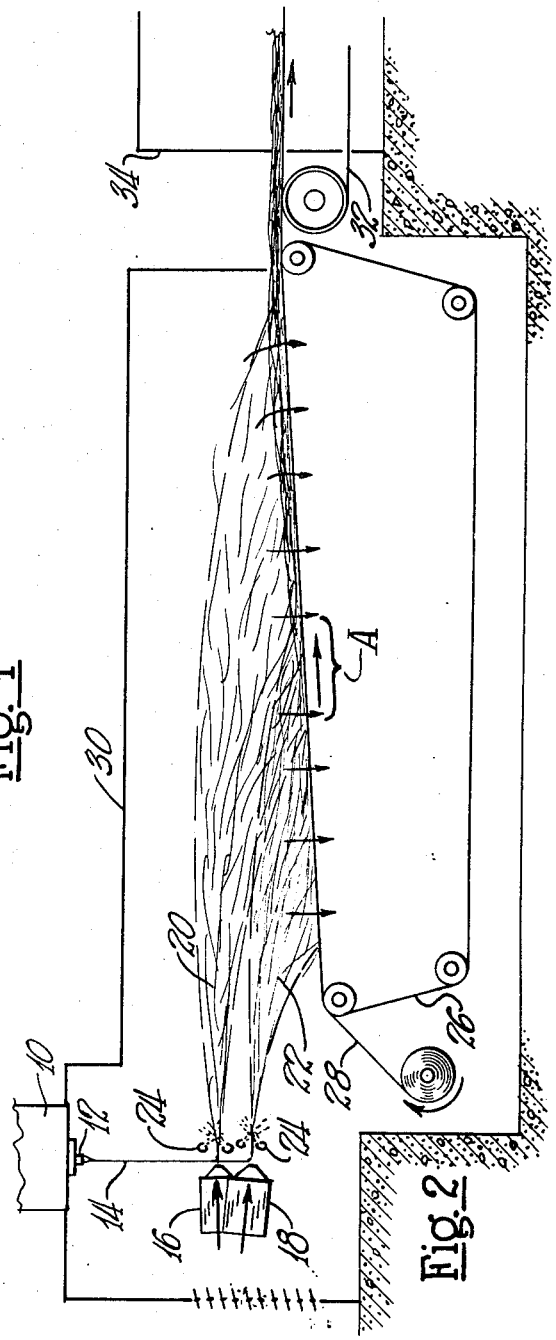

IRVING N. SMITH &
JACK R. PFEFFER
INVENTORS

ATTORNEYS

3,690,852
METHOD OF PRODUCING GRADED FIBROUS FILTER MEDIA

Irving N. Smith, Saratoga, and Jack R. Pfeffer, Los Gatos, Calif., assignors to Owens-Corning Fiberglas Corporation
Filed Dec. 29, 1969, Ser. No. 888,767
Int. Cl. C03c 27/00
U.S. Cl. 65—3      7 Claims

ABSTRACT OF THE DISCLOSURE

A process for producing a graded fibrous filter media preformed in a mat by intermingling mineral fibers of one average diameter with fibers of smaller average diameter in the area of a plane parallel with a major face of the mat. Two groups of fibers of different diameter are attenuated and blown horizontally upon a moving conveyor such that the groups intermingle with each other to a limited extent prior to deposition on the conveyor to produce a two layer, graded density product having a gradual transition between fiber layers.

---

It is an object of the invention to produce a graded fibrous filter media which exhibits improved dust holding capacities and provides for substantial depth loading without becoming inoperative through surface loading of dust particles on the upstream surface of the media.

Another object of the invention is to provide a process for producing a graded fibrous filter media with a fine fiber adjacent to a backing material and a coarse fiber adjacent to and superposed upon the finer fiber wherein the boundaries of the fiber layers intermingle and thereby provide a gradual transition of fibers of one diameter to fibers of another diameter.

A further object of the invention is to provide a process of producing a graded fibrous filter media with a fine fiber adjacent a backing material with a coarser fiber on top of the finer fiber in a single path operation.

The above objects of the invention may be achieved by forming a graded fibrous filter media including the steps of feeding a first plurality of glass fibers to a first high temperature, high velocity gas stream, which attenuates them into fibers of a fine diameter and disposes the fine fibers upon a moving conveyor and simultaneously feeding a second plurality of fiber glass to a second high temperature, high velocity gas stream to attenuate fibers of a finer fiber diameter, causing the same to be disposed on the first fibers which have been disposed on said moving conveyor; and coating the first and second plurality of fibers with a resin binder and curing the resin binder.

Other objects and advantages of the invention will become apparent from the following detailed description of a preferred embodiment of the invention, with reference being made to the accompanying drawings in which:

FIG. 1 is a top plan view of the apparatus for carrying out the process of the invention;

FIG. 2 is a side elevational view of apparatus illustrated in FIG. 1;

Figure 3:
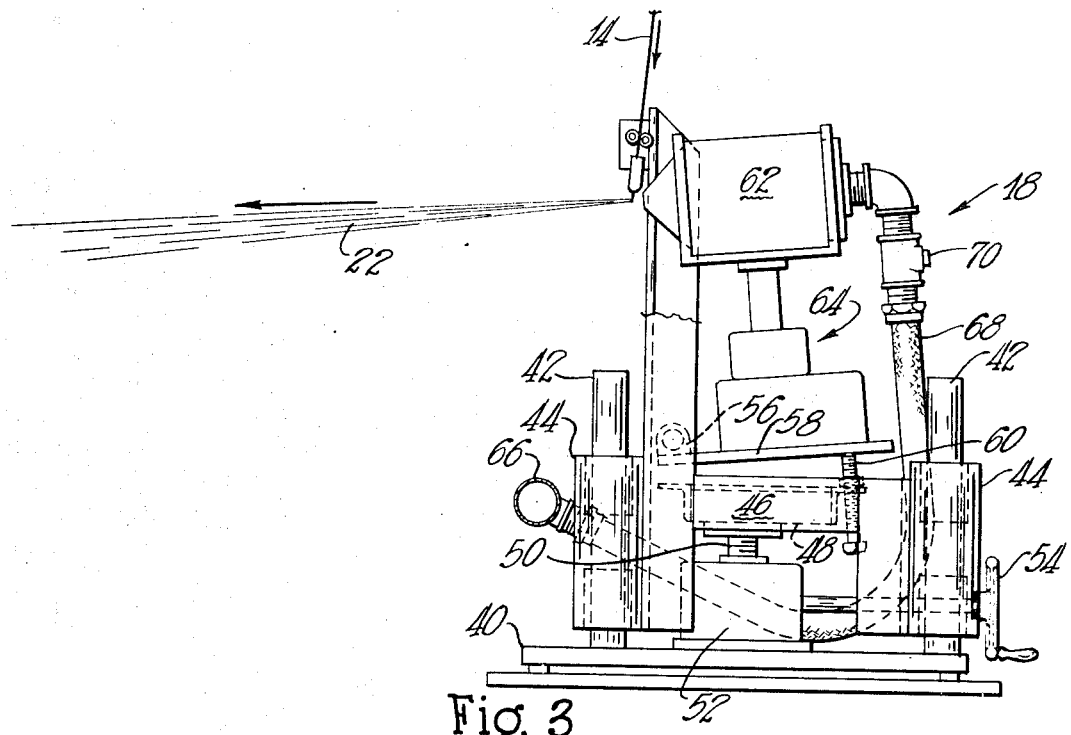
FIGS. 3 and 4 are enlarged fragmentary views of a burner assembly of the apparatus illustrated in FIGS. 1 and 2.

Referring to FIGS. 1 and 2, a glass melting tank, generally indicated by reference numeral 10, has a plurality of bushing elements 12 (only a single one being illustrated in FIG. 2) for producing discrete streams 14 of molten glass. The streams 14 of molten glass are referred to as primary glass fibers and are typically drawn from a plurality of orifices positioned in the bushing elements 12.

The primary fibers 14 are subjected to high temperature, high velocity blasts from hot gas jets or burners 16 and 18 which are generally known to the art and comprise a gas heater adapted to deliver gases at high temperatures and high velocity through suitably arranged nozzles. The hot gases emanating from the burners 16 and 18 melt the primary fibers to attenuate them into finer secondary fibers. The velocity of the respective blasts and temperatures of the hot gases therefrom are adjusted so that the average fiber diameters of the secondary fibers 20 produced by the center burner 16, as seen in FIG. 1, will be in the order of .0001 inch diameter and the secondary fibers 22 produced by the outermost burners 18 will have an average diameter in the order of .00003 inch. The fibers 20 can range from an average diameter of .00006 inch to .00015 inch while the fibers 22 can range from an average diameter of .00002 inch to .00005 inch.

Figure 4:
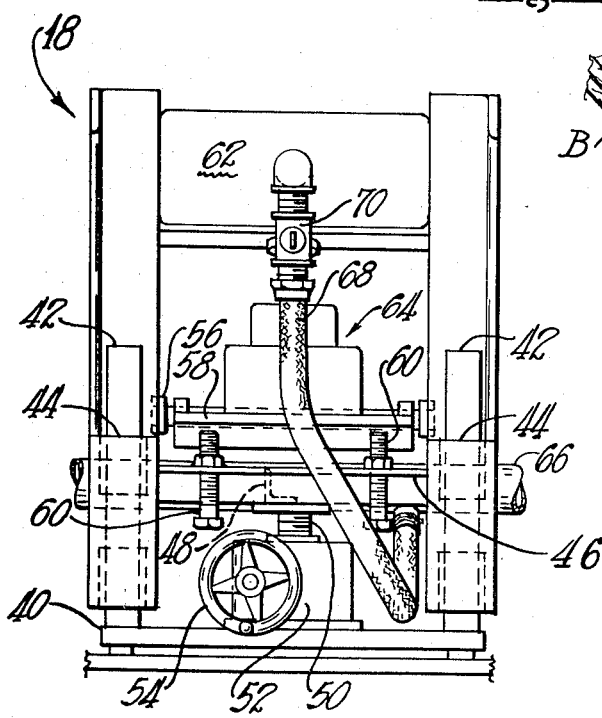

The burners 16 and 18 are substantially identical with one another and are mounted within the system by a device which facilitates vertical adjustment thereof as well as adjustment about a horizontal axis. The details of this mechanism for mounting the burners are illustrated in FIGS. 3 and 4.

The outer two burners 18 are positioned on opposite sides of a center burner 16 and are directed at a downward angle of four degrees below the horizontal, causing the blast emanating therefrom to be directed toward the surface of a foraminous forming conveyor 26 at a position relatively close to the burners 18. The center burner 16 is directed upwardly at approximately one degree above the horizontal thereby causing the blast emanating therefrom to fall toward the surface of the forming conveyor at a considerable distance downstream of the burner 16 so that this blast will fall upon the finer fibers 22 already deposited on the conveyor 26. Additional separation of the fibers in two different average diameters is achieved by raising the center burner 16 with respective burners 18 and/or lowering the burners 18 with a typical vertical separation of twelve inches.

During certain applications, it may be desirable to reverse the angular positions of the burners 18 in relation to the center burner 16. In the preferred embodiment the angles are such that, during the manufacturing process, the intermingling of the second layer of coarse fibers 20 on the first layer of finer fibers 22 occurs in part before the entire first layer of fibers 20 has been deposited, thereby resulting in substantial intermingling of the fibers 20 and 22 and thus a gradual transition of fibers of one diameter to fibers of another diameter. As viewed in FIG. 2, the lower boundary of the coarse fiber group 20 intersects the upper boundary of the fine fiber group 22, at the area designated A, before either group is fully deposited on the conveyor 26 to cause such gradual transition.

Figure 5:
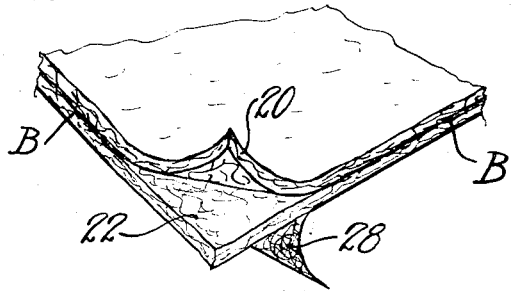
FIG. 5 is a sectional view of the fibrous filter media produced by the apparatus illustrated in FIGS. 1–4.

By utilizing the web of backing material 28, as shown in FIG. 5, which is disposed upon and travels with the upper surface of the conveyor 26, a satisfactory product can be obtained withou the problem of having the fibrous material adhere to the surface of the forming conveyor 26. The use of the backing material 28 imparts strength to the resulting product to withstand mechanical stresses and manual handling, even though the fibrous media disposed thereon is extremely light in weight.

The burners 16 and 18 and the conveyors 26 are housed within an outer housing 30 provided with a vacuum producing means (not shown) positioned underneath the foraminous conveyor forming belt 26 to assist in the deposit of the fibers upon the belt 26.

As the secondary glass fibers are being formed by the air blasts from the burners 16 and 18, they are simultaneously sprayed with a binder material from a plurality of nozzles 24 to coat the glass fiber with a continuous coating of material, such as, for example, a phenol formaldehyde resin. The nozzles 24 are provided with means to control the flow of the binder material therefrom so that any desired weight of binder in respect to weight of the finished product may be produced.

The composite fiber material impregnated with the binder solution is advanced by the conveyor 26 and transferred to a second conveyor 32 which carries the material through an oven 34, where the binder is cured. Upon emergence from the oven 34, the cured glass fiber products may be packaged in roll form or in any other convenient manner.

FIGS. 3 and 4 illustrate an arrangement for mounting the burner assemblies 16 and 18 for effecting a tilting thereof about a horizontal axis as well as for effecting vertical movement thereof.

The burner assemblies 16 and 18 are mounted upon a base 40 which contains a number of upstanding guide rails 42. A hollow guide sleeve 44 is slidingly received on each of the guide rails 42. Rigidly secured between the adjacent guide sleeves 44 on each side of the base 40 is a horizontally extending channel member 46. In the apparatus illustrated there are four guide rails 42 and associated cylindrical guide sleeves 44, and two channel members 46, one on each side of the base 40.

A support plate 48 having two opposing ends is welded or otherwise engaged to the arms of the two channel members 46. Depending from under the surface of the support plate 48 is an externally threaded shaft 50 which is operatively associated with a worm jack unit 52 having an operating handle 54. It will be readily apparent that the primary support plate 48 may be moved up or down by the jack unit 52 depending on the direction of movement of the handle 54.

A pivotal mounting 56 is secured to the front portion of the primary support plate 48 and is coupled to the front end of a tiltable support plate 58. Pivotal adjustment of the support plate 58 with respect to the primary support plate 48 is attained by a pair of spaced apart threaded bolts 60. By turning the threaded bolts 60 in one direction the plate 58 may be tilted upwardly about the pivotal mounting 56 and turning the bolt 60 in an opposite direction the plate 58 may be tilted downwardly relative to the support plate 48.

A main burner 62 is mounted on a tiltable plate 58 by a burner mount assembly generally indicated by reference numeral 64. Combustion gases are fed to the main burner 62 from a gas pipe 66 through a flexible pipe 68 and a valve coupling 70.

It will be apparent from the above description that the burner assemblies 16 and 18 are provided with means for vertically adjusting the height thereof as well as for adjusting the angle of the assembly relative to a horizontal axis. The secondary fibers being attenuated may be caused to fall on the conveyor 26, as diagrammatically illustrated in FIGS. 1 and 2, and their positions of deposition thereon is adjustable.

FIG. 5 illustrates the product produced by the above described method and apparatus. The resulting product illutsrated is formed with the predominance of the fine fibers 22 adjacent the surface containing the backing 28 and a predominance of coarse fibers 20 adjacent the opposite surface. Further, since according to the process described, the airborne fibers of one diameter will intermingle with those airborne fibers of the smaller diameter prior to deposition, the resulting product will have an area, designated by letter B, of intermingled fibers between the two layers which prevents separation of the layers and provides a gradual transition between layers. When the resulting product is used as a filter, the layer of coarser fibers 20 is positioned on the intake or upstream side so that the largest particles are initially retained thereon to prevent these particles from completely closing off the smaller voids between the fibers 22 in the finer layer.

A further and important feature of the product resides in the formation of the surface opposite and away from the backing material 28. Since the fibers are dispersed during the manufacturing process in a random fashion, the upper surface is quite irregular. The surface irregularity provides a larger effective surface area which is advantageous for a product used as a filter media. The large surface area together with the relatively larger openings which are provided by the coarser fibers enables a large amount of particulate material to be collected thereby without "masking off" the media which would otherwise occur to render the media inoperative as a filter.

The backing 28 may be a non-woven viscous, a bonded mat of glass fibers, or a woven fabric. In certain applications the unfinished fiber product can be manufactured without the use of a backing material. It will be appreciated that the use of a backing material greatly facilitates the removal of the fiber product from the associated foraminous conveyor 26, imparts additional tensile strength to the finished product, and adds to the handling characteristics of the product.

While the drawings and description thereof disclosed the utilization of fibers of two diameters, it will be apparent to those skilled in the art that fibers of three or more diameters could be likewise employed using the principals of the above described process and other variations will occur to those skilled in the art and may be made without departing from the spirit and scope of the following claims.

We claim:

1. A method of producing a graded fibrous media comprising the steps of forming a plurality of fibers, attenuating a group of such fibers by a fluid stream to form a first group of relatively fine fibers and to deposit said first group upon a moving conveyor, attenuating another group of such fibers by a second fluid stream to form a second group of relatively coarse fibers and to deposit said second group upon said first group on said moving conveyor with only a portion of said first and second groups intersecting and intermingling prior to being deposited on said moving conveyor to form an intermediate boundary layer between said groups of fibers.

2. A method of producing a graded fibrous media having at least two layers of fibers having different diameters joined together by a discrete layer containing intermingled fibers of each diameter comprising the steps of projecting an airborne stream of a plurality of fibers of one diameter upon a moving conveyor, projecting an airborne stream of a plurality of fibers of another diameter upon the fibers of said one diameter on said conveyor with only a portion of said airborne streams intersecting above said conveyor to intermingle said fibers of different diameter in said stream portion prior to their deposition upon said conveyor to form said discrete layer between said layers of fibers.

3. A process for producing a graded fibrous filter media including the steps of attenuating a first plurality of glass fibers; feeding the fibers of said first plurality to a first high temperature, high velocity gas stream to cause the same to be attenuated to a first average fiber diameter and deposited on a moving conveyor, attenuating a second plurality of glass fibers; feeding the fibers of said second plurality to a second high temperature, high velocity gas stream to cause the same to be attenuated to a second average fiber diameter, the average fiber diameter being greater than the average fiber diameter of said first plurality and deposited upon the fibers of said first plurality already on said conveyor, with only a portion of said second plurality intersecting and intermingling with only a portion of said first plurality prior to being deposited upon said conveyor to form an intermediate boundary layer between said larger and smaller fibers.

4. A process for producing a graded glass fiber filter media having at least two distinct layers of fibers of different diameter joined together by an intermediate boundary layer of intermingled fibers of each diameter comprising the steps of forming a first group of primary fibers, feeding said first group to a source of high temperature, high velocity gas effective to attenuate said first group into finer fibers of a first average diameter and to direct them in an airborne stream upon a moving conveyor, forming a second group of primary fibers and feeding said second group to another source of high temperature, high velocity gas effective to attenuate said second group into finer fibers of a second average diameter different from said first average diameter and to direct them in an airborne stream upon the first finer fibers deposited on said conveyor, with said sources of high temperature and velocity gases adjusted such that portions of said airborne streams intersect above said conveyor to intermingle said fibers of different diameters to provide said intermediate boundary layer.

5. The process of claim 4 which further includes the steps of applying a curable binder resin to said fibers in said airborne streams and curing said resin in said graded media following formation thereof on said conveyor.

6. The process of claim 5 which further includes the step of disposing a backing sheet of flexible material upon said conveyor prior to fiber deposition thereon whereby said graded media is formed upon said backing sheet.

7. The process of claim 5 wherein said first group of primary fibers is attenuated into finer fibers having an average diameter of 0.00003 inch and said second group is attenuated into fibers having an average diameter of 0.0001 inch.

References Cited

UNITED STATES PATENTS

| | | | |
|---|---|---|---|
| 2,728,699 | 12/1955 | Labino | 65—4 X |
| 2,751,962 | 6/1956 | Drummond | 65—4 X |
| 3,276,928 | 10/1966 | Pearson et al. | 65—4 UX |
| 3,328,230 | 6/1967 | Levecque et al. | 65—4 X |
| 3,497,337 | 2/1970 | Denniston | 65—7 |

ROBERT L. LINDSAY, JR., Primary Examiner

U.S. Cl. X.R.

55—485; 65—4; 156—62.2, 62.4